United States Patent [19]

Weiss

[11] Patent Number: 4,655,713

[45] Date of Patent: Apr. 7, 1987

[54] DEVICE FOR READING AND WRITING AND THE TEACHING OF LITERACY

[76] Inventor: Martin M. Weiss, 6345 Daylight Dr., Agoura Hills, Calif. 91301

[21] Appl. No.: 712,126

[22] Filed: Mar. 15, 1985

Related U.S. Application Data

[63] Continuation-in-part of Ser. No. 586,236, Mar. 5, 1984, abandoned.

[51] Int. Cl.$^4$ .............................................. G09B 17/00
[52] U.S. Cl. ...................................... 434/178; 283/46
[58] Field of Search ............... 434/178, 156, 159, 167; 283/45, 46

[56] References Cited

U.S. PATENT DOCUMENTS

| | | | |
|---|---|---|---|
| 140,135 | 6/1873 | Hildreth | 434/178 |
| 3,426,451 | 2/1969 | Hoffmann | 434/178 |
| 4,007,548 | 2/1977 | Cytanovich | 434/178 |
| 4,193,212 | 3/1980 | Al-Kufaishi | 434/178 |
| 4,315,748 | 2/1982 | Frascara et al. | 434/178 X |

OTHER PUBLICATIONS

Webster's Seventh New Collegiate Dictionary ©, 1967, Inside Cover Page and p. 635.

*Primary Examiner*—William H. Grieb

[57] ABSTRACT

A reading device is described herein that may be employed for the teaching of reading or as an independent reading system. The device is novel in being able to reduce the thousands of possible variations of pronunciation in the alphabet of the English language to a logical, easily learned core. This is achieved via the addition of non-pictorial short-stroke practical symbols.

These non-pictorial short-stroke symbols are unique in having an appearance that is suggestive of, or rapidly identifiable with the sound they represent. In addition, these non-pictorial short stroke symbols are unique in having a consistent sound in and of themselves, independent and independently of any letter or letters.

This device is further remarkable in that letters, that do not have a logical pronunciation within the context of the affected word, are superseded by suprascript letters that accurately reflect the appropriate pronunciation.

The device is further defined in differentiating between letters that are active and passive within the system. Those letters that are active initiate a distinct sound within the system. Those that are passive have their sound provided instead by a short-stroke non-pictorial symbol, or by a suprascript letter, or are redundant or silent. This allows the recognition of logical, (necessary) and illogical (unnecessary) letters in the device. The distinction between active and passive letters is provided by contrast in color, intensity, or typestyle.

17 Claims, 11 Drawing Figures

FIGURE 1

| | | | |
|---|---|---|---|
| 8 | B̲AY<br>8 | O | B̲OAT<br>o |
| = | B̲EAT<br>= | ⌐ | B̲OUGHT<br>⌐ |
| -- | B̲AR<br>-- | ∞ | B̲OOT<br>∞ |
| + | B̲AD<br>+ | ⊙ | B̲ITE<br>⊙ |
| ⊢ | B̲ED<br>⊢ | ⊖ | B̲OUNCE<br>⊖ |
| ∩ | B̲UD<br>∩ | O' | B̲ULL<br>O' |
| | ʕ | B̲I͡RD | |

FIGURE 2 has^z
+ of^v

FIGURE 3

KNIT

HI$\overset{Z}{S}$

BILL

BAY
8

FIGURE 4

THIS

SHIP

CHIP

SING

SH
NATION
8

FIGURE 5

THIS

SHIP

CHIP

SING

PR̂ACTI·ĈAL
 +    ͻ

J
LOG·I·ĈAL
=        ͻ

BILL    KIT    TIN

FIGURE 9

ILL    IT    IN    FILL

FIGURE 10

CALL    RACK    R<sup>S</sup>ICE
Γ              +              ⊙

FIGURE 11

OH SAY CAN YOU
o 8 + ∞

SEE BY THE DAWNS ᶻ
= −     г

EARLY LIGHT
  ʳ
  =  ☉

DEVICE FOR READING AND WRITING AND THE TEACHING OF LITERACY

This is a continuation-in-part of my earlier field copending application Ser. No. 06/586,236, filed on Mar. 5, 1984, and now abandoned.

SUMMARY OF THE INVENTION

A reading device is described here-in to provide a rapid and logical and easy system for reading. The device has a substrate comprising at least one of paper, metal, plastic or wood, having reproduced on it a plurality of letters of the American Language. Under, or above each letter, where applicable, non-pictorial short-stroke symbols, representing a distinct vowel sound of diphtong sound, are placed. These non-pictorial short-stroke symbols act as phonetic helpers, and are unique in having an appearance suggestive of, or readily identifiable with the sound they represent. These symbols have a consistent sound, in and of themselves, independent, and independently of any letter or letters.

Where spelling does not reflect pronunciation, a more applicable letter is placed above the clarified letter.

Letters within this system are divided into two classes, the active and the passive. Those letters which are in the active class initiate a distinct sound within this system. Those of the passive class have their sound provided instead by the non-pictorial short-stroke symbols, or by suprascript letters, or are redundant or silent. The distinction between the active and passive classes is provided by a contrast in color, intensity, or typestyle.

BACKGROUND OF THE INVENTION

Children (and adults) have short attention spans. It is difficult for them to pay attention to a laborious process that takes years to master. Reading is difficult for American children because the way a word is pronounced bears only a passing relationship to the way it is written. Children as well as illiterate adults are overwhelmed by a system of reading that is based as much as hieroglyphics (i.e. sight recognition) as on phonics. European children, on the other hand, have their language written phonetically. While American children are struggling at a "Dick and Jane" level, European children are reading from the classics. Our schools do not recover from this handicap. American University students are at the educational level of European high school students. Many American children never learn to read adequately. Functional illiteracy is a heavy burden for these children to carry when the reach adulthood, and a problem for this country as well, both socially and economically.

The invention of the present application provides non-pictorial short-stroke symbols, acting as phonic helpers, that give a logical framework upon which one can rapidly learn to read. In the same way that training wheels aid to the process of learning to ride a bicycle, thse non-pictorial short-stroke symbols aid in the process of learning to read.

This system supplements, it does not replace, correct spelling. The student is reading from great or popular literary works, instead of "Dick and Jane". These works are far more stimulating, and thus he reads more. The more he reads, the quicker he recognizes words by sight, and he no longer depends on the non-pictorial short-stroke symbols. The student will be encouraged and motivated by his rapid progress.

An earlier attempt to provide a method for the teaching of reading is that of Hoffman. Hoffman, U.S. Pat. No. 3,426,451, requires eight varieties of typeface and over seventy characters to effect a phonic alphabet. In Hoffman, the numerous typeface styles are required in order to adequately represent the many variations of pronunciation in individual letters (e.g. there are eight typeface forms for the letter "O"). Unlike Hoffman, the invention of the present application utilizes non-pictorial short-stroke symbols, rather than variations in typeface, to effect vowel and diphthong pronunciation.

BRIEF DESCRIPTION OF THE INVENTION

FIG. 1 illustrates non-pictorial short-stroke symbols and their sound, with examples of usage.

FIG. 2 illustrates usage of suprascript letters to provide a more logical development of pronunciation.

FIG. 3 illustrates methods of differentiating between the system's active class and passive class of letters.

Figure 5:
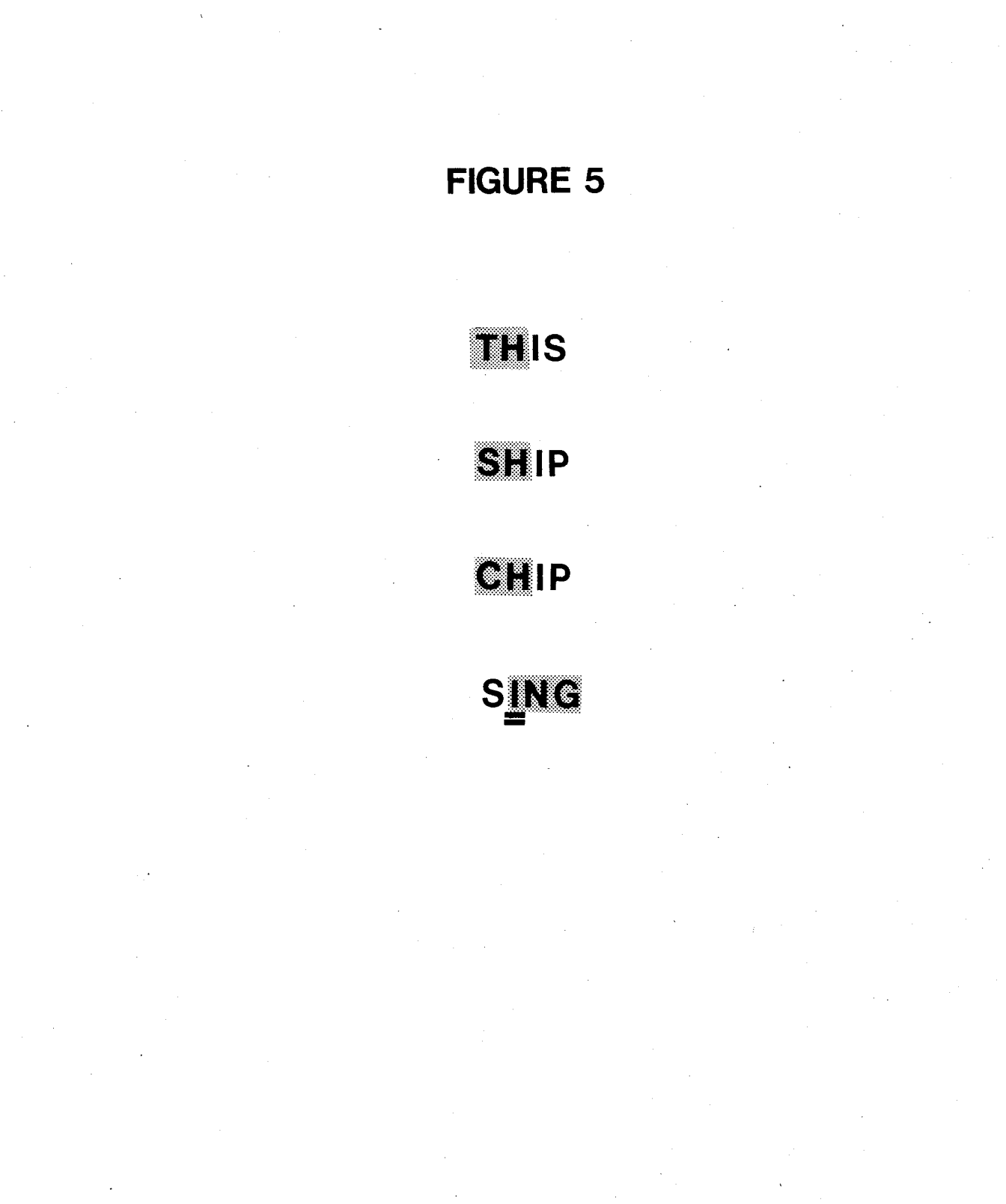
Figure 6:
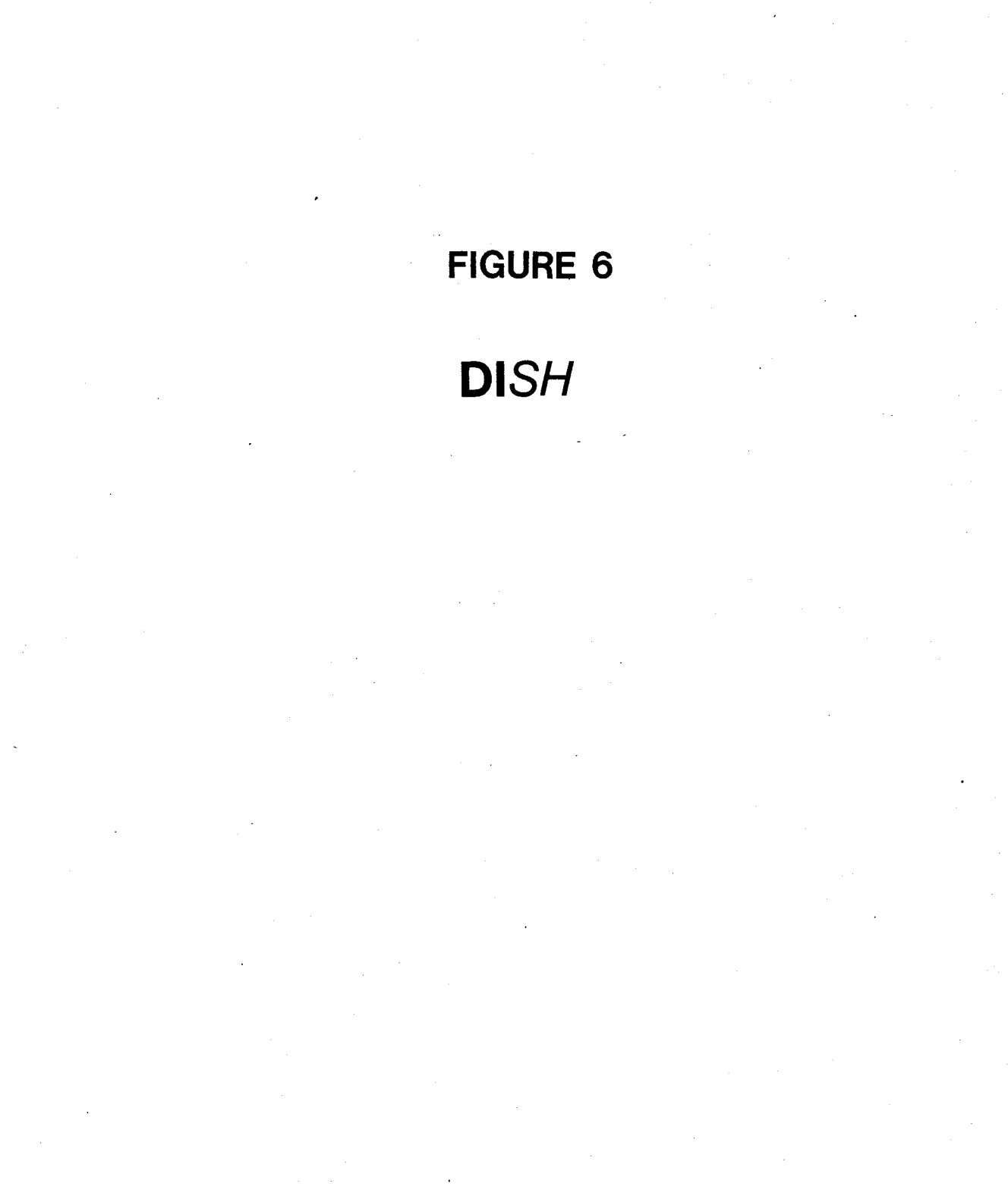

FIGS. 4, 5, and 6 illustrate identification of those combinations of letters which when combined to form a single sound, have a sound different than that would be expected from their individual letters.

Figure 7:
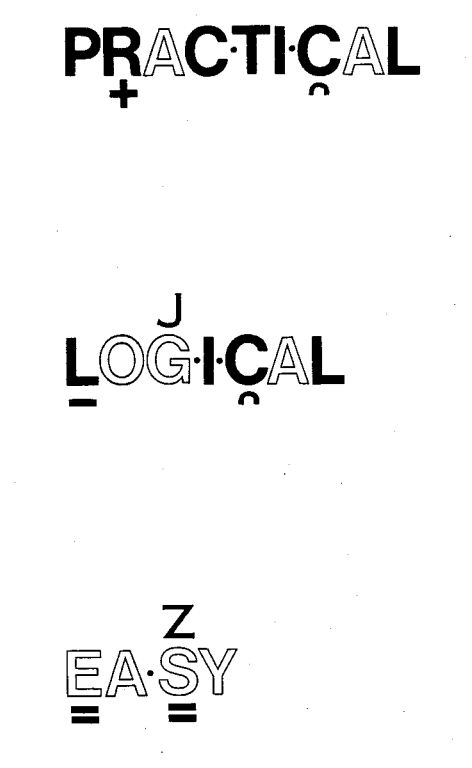

FIG. 7 illustrates method for denoting syllables.

FIG. 8 illustrates sound of consonants unmodified by non-pictorial short-stroke symbols.

FIG. 9 illustrates sound of the letter "I" unmodified by non-pictorial short-stroke symbols.

FIG. 10 illustrates sound of the letter "C" with and without an S suprascript.

FIG. 11 illustrates use of non-pictorial short-stroke symbols, suprascript letters, active and passive classes and syllable notation in a sentence.

DETAILED DESCRIPTION OF THE INVENTION

Referring to FIG. 1, the alphabet of the present invention can be seen to comprise a system wherein non-pictorial short-stroke practical symbols are placed under the appropriate letters. These symbols are designed to have an appearance suggestive of, or readily identifiable with, the sounds they represent. These symbols have a consistent sound in and of themselves, independent and independently of any letter or letters.

The symbols are designed to be easily learned and remembered by a child. For example, the "ay" sound in ate, eight, is represented by the symbol for the figure eight. Thus, this symbol is used in words such as BAY, LAY, LATE, LAME, NAME, SAME etc.

The "e" sound in equal, is represented by an equal sign. This symbol is used in words such as EAT, EAR, BEAT, BE, ME, etc.

The "ah" sound such as provided by the letter "o" in olive, is represented by a short straight line i.e. a bar. This symbol is used in words such as BAR, CAR, TAR, TOM, MOM, ON, OLIVE, etc.

The "eh" sound as provided by the letter "e" in add, is represented by the symbol for add, the addition sign. This symbol is used in words such as ADD, BAD, SAD, SAT, CAT, MAT, etc.

The "eh" sound as provided by the letter "E" in ED, is represented by a variation of the addition sign. Distinguishing between the vowel sound in BAD and BED is subtle and difficult for the child and overemphasis of this difference will only frustrate the child. Thus the symbols are very similar yet also distinguishable from each other, to correlate with their similar yet distinguishable sound. If the child or adult confuses the two symbols, it is not a serious issue, as the correct pronunciation will readily be apparent from the context of the word or sentence. This modified addition symbol is used in words such as ED, BED, SAID, SET, MET, etc.

The "uh" sound as provided by the letter "u" in under, is represented by a curved symmetric line that is suggestive of a bud. This symbol is used in words such as BUD, MUD, SUB, SUN, etc.

The zero as a non-pictorial short-stroke symbol, sounds like the letter "o", as in the name of that letter. Examples of usage would be OAT, BOAT, LOW, etc, The perpendicular lines form a right angle and are designed to be suggestive of the outline of an awning. This symbol sounds like "AW" in AWNING, OUGHT, BOUGHT, etc.

The two zeros represent the sound of "OO" in BOO! They are suggestive of a ghost's eyes. Examples of usae are BOO!, SUE, DEW, BOOT, etc.

The zero with the dot in the center is designed to suggest an eye. It's sound is that of the "I" in Island. Examples of usage are EYE, I, MY, BY, BITE, etc.

The line through the circle combines the "AH" and "O" symbols. It sounds like the "OW" in OUCH! Examples of usage are OUCH!, OUT, COW, NOW, etc.

The zero with the curved line represents the "OO" sound in Book. It is designed to be suggestive of a bull. Examples of usage are BULL, BOOK, COOK, etc.

The curved line is placed before the letter "R" where the R is to sound like the "UR" in curve. It is shaped to suggest the concept of a curve and thus suggest the sound of "UR". Examples of usage are EARTH, BIRD, URN, SIR, SWIMMER, etc.

The above are examples of non-pictorial short-stroke symbols providing vowel and diphthong sounds. Other non-pictorial short-stroke symbols may also be used, as well as additional symbols.

Figure 2:
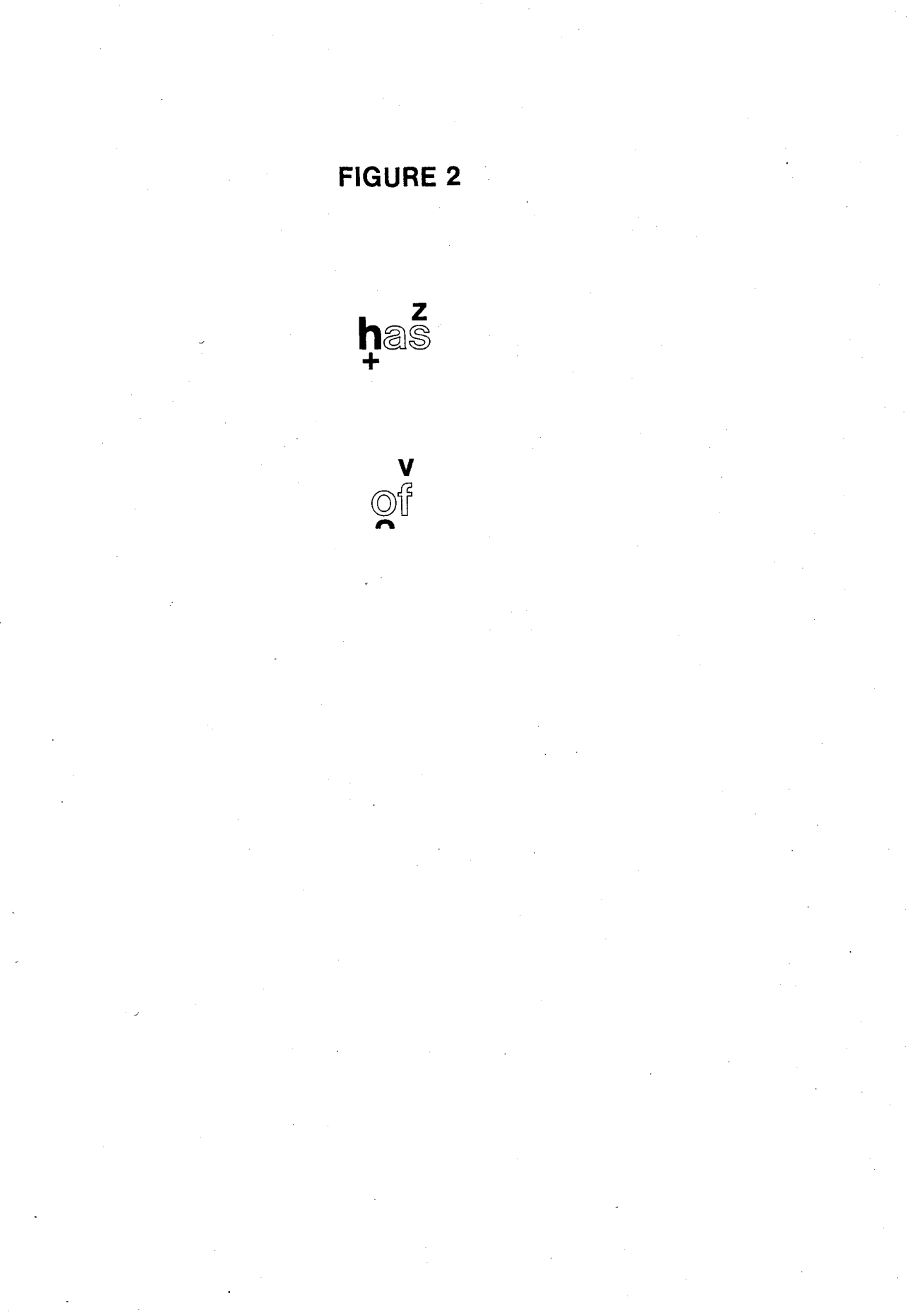

Referring to FIG. 2, it can be seen that where a written letter is pronounced not as itself, but instead pronounced as another letter, the latter letter is placed over the former as a suprascript. The suprascript letter or letters supersede the underlying letter or letters in pronunciation.

Figure 3:
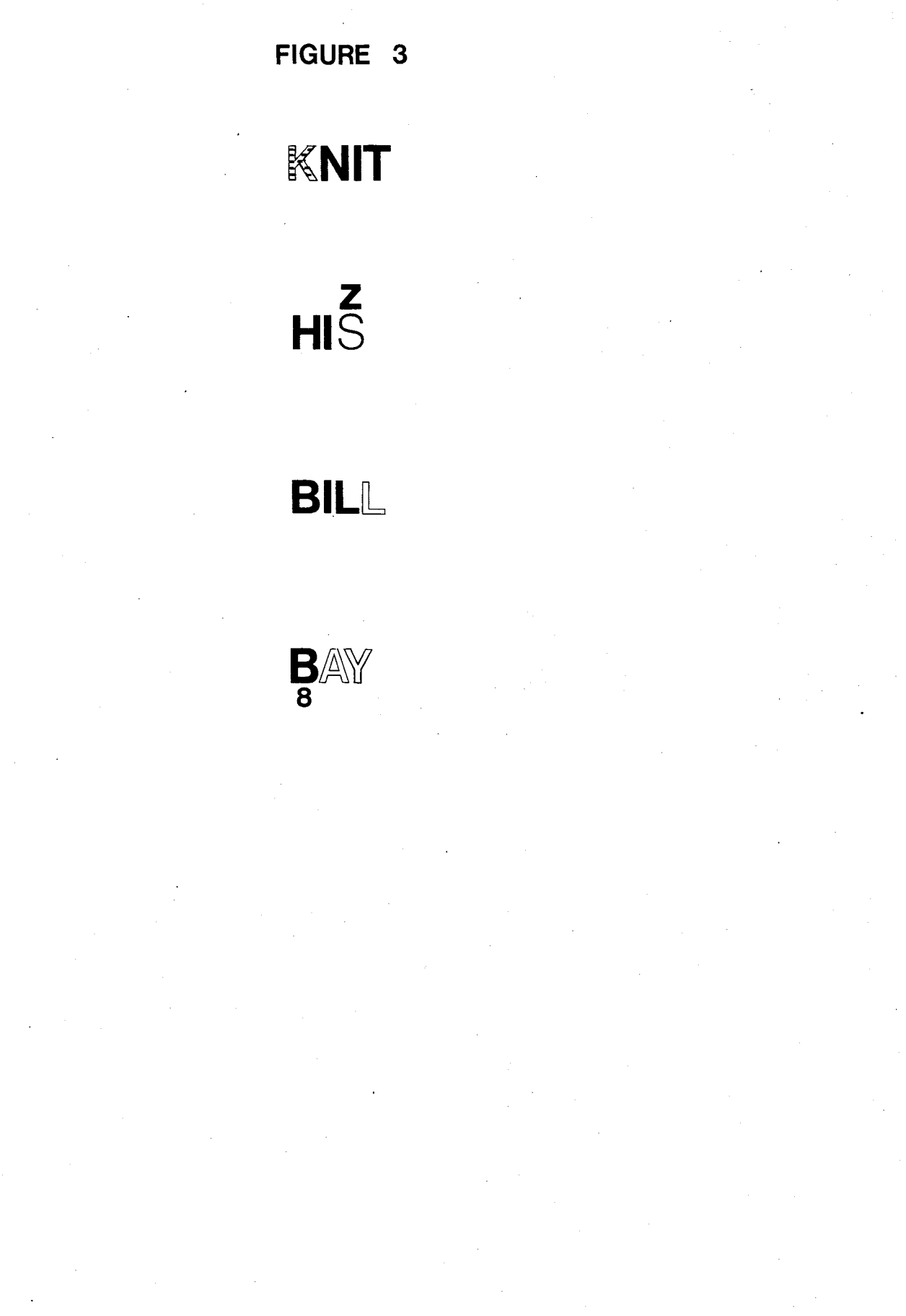

Shown in FIG. 3 is the differentiation between those letters which are of the active class and passive class within the system. Those of the active class initiate a distinct sound. The letters of the passive class are those letters which are replaced by non-pictorial short-stroke symbols, those letters which are superseded by suprascript letters, those letters which are silent in words, and those letters which are redundant. The differentiation between the active and passive classes can be seen to be accomplished by contrast in color, contrast in intensity, and contrast in typeface.

Two or more letters which combine to form an unrelated third sound can be noted by a bar over the affected letters. Examples are shown in FIG. 4.

Two or more letters which combine to form an unrelated third sound can be noted by use of a background screen behind the affected letters. Examples are shown in FIG. 5.

Two or more letters which combine to form an unrelated third sound can be noted by typeface contrast when said typeface contrast is not being utilized to differentiate those letters which are active and passive within the system. Examples are shown in FIG. 6.

Syllables can be denoted by a small dot inserted between letters. There is no spacing provided for this mark; it is inserted within the normal spacing between letters. Examples are shown in FIG. 7.

Consonants without non-pictorial short-stroke symbols beneath, sound like the basic letter without vowel modification. Examples are in FIG. 8.

The letter "I", without non-pictorial short-stroke symbols beneath, sounds like "IHH". Examples are in FIG. 9.

The letter "C", sounds like K, except where there is an "S" suprascript. Examples are in FIG. 10.

FIG. 11 illustrates the use of non-pictorial short-stroke symbols, suprascript letters, active and passive classes within the system, and syllable notation in a sentence.

It is seen that the student is left with a logical core of letters and symbols that greatly simplify the task of reading, yet maintaining the correct spelling.

I claim:

1. A method of teaching reading in which the student is presented with an orthography comprising of the set of letters of the American Alphabet, in combination with a set of non-pictorial short-stroke phonograms, constituting an alphabet adapted to be employed in teaching students, and adult illiterates, to read, said phonograms having an appearance that is readily suggestive of, or readily identifiable with, the sound they are to represent, in that the form the phonograms take is designed to prompt an association in the mind of the reader as to the sound the phonograms represent, without need of rote memorization.

2. A method, as in claim 1, in which all the letters may initially be of either the upper or lower case form, or a combination of both cases.

3. A method of teaching reading in which the student is presented with an orthography comprising of the set of letters of the American Alphabet, in combination with a set of non-pictorial short-stroke phonograms, constituting an alphabet adapted to be employed in teaching students, and adult illiterates, to read, said phonograms having a consistent, unaltering sound, in and of themselves, independent and independently of any letter or letters, whereby there is but one phonogram per sound, and one sound per phonogram.

4. A method of teaching reading consisting of a set of non-pictorial short stroke phonograms in combination with an orthography comprising of the set of letters of the American Alphabet, where distinction by a contrast in typeface is provided between two classes of letters, namely:

a. the logical class
　b. the illogical class where the letters of the logical class are those letters and combination of letters within a word whose sound is the single classic typical sound of that letter and combination of letters, and whose sound is therefore consistent: and where the letters of the illogical class are those letters within a word whose sound varies from the classic typical sound of that letter and whose sound is therefore variable and inconsistent, and where the letters of the illogical class also include those letters which have no single classical, typical sound.

5. A method, as in claim 4, where letters whose sound is that of the primary consonant sound, are included in that class of letters which are logical.

6. A method, as in claim 4, where letters which are vowels, as vowels have no single consistent sound, are included in that class of letters which are illogical.

7. A method, as in claim 4, where letters which are redundant within the pronunciation of a word, are included in that class of letters which are illogical.

8. A method, as in claim 4, where letters in a word which are silent in the pronunciation of the word. are included in that class of letters which are illogical.

9. A method, as in claim 4, where when letters in the spelling of a word do not logically represent the pronunciation of that word, those letters are included in the class of letters which are illogical.

10. A method of teaching reading consisting of a set of non-pictorial short stroke phonograms in combination with an orthography comprising of the set of letters of the American Alphabet, where distinction is provided by a contrast in color between two clases of letters, namely:
   a. the logical class
   b. the illogical class
where the letters of the logical class are those letters and combination of letters within a word whose sound is the single classic typical sound of that letter and combination of letters, and whose sound is therefore consistent: and where the letters of the illogical class are those letters within a word whose sound varies from the classic typical sound of that letter and whose sound is therefore variable and inconsistent, and where letters of the illogical class also include those letters which have no single classical, typical sound.

11. A method of teaching reading consisting of a set of non-pictorial short stroke phonograms in combination with an orthography comprising of the set of letters of the American Alphabet, where distinction is provided by a contrast in intensity between two classes of letters, namely:
   a. the logical class
   b. the illogical class
where the letters of the logical class are those letters and combinations of letters within a word whose sound is the single classic typical sound of that letter or combination of letters, and whose sound is therefore consistent: and where the letters of the illogical class are those letters within a word whose sound varies from the classic typical sound of that letter and whose sound is therefore variable and inconsistent, and where the letters of the illogical class also include those letters which have no single classical, typical sound.

12. An alphabet consisting of the orthography of American letters for use in connection with a method of reading comprising of a unified set of non-pictorial short stroke phonograms, which may be suggestive of, or readily identifiable with the sound they are to represent, in which these phonograms are placed above or below the plane of the word, in the location where they are to be pronounced, so as not to alter the correct spelling of the word, and where these phonograms are to:
   a. have a consistent sound, in and of themselves, independent and independently of any letters;
   b. encompass in their breadth the span of vowel and diphthong sounds of the American language.

13. An alphabet, as in claim 12, wherein where the correct spelling does not logically or obvious reflect correct pronunciation, the letter or letters which most closely reflect correct pronunciation are placed in direct contiguity with the letter or letters they clarify, without the interposition of any other letter or letters, making for a single word entity.

14. An alphabet, as in claim 1, where when preservation of traditional spelling is not of concern, then the phonograms may be inserted in the plane of the word.

15. An alphabet consisting of the letters of the American Alphabet, in combination with a unified set of non-pictorial short-stroke phonograms, in which these phonograms may be suggestive of, or readily identifiable with the sound they are to represent, and in which these phonograms are placed above or below the plane of the word, in the location they are to be pronounced, so as not to alter the correct spelling of the word, and where these phonograms are to:
   a. have a consistent sound, in and of themselves, independent and independently of any letters;
   b. encompass in their breadth the span of vowel and diphthong sounds of the American language;
and where in this system, when two or more letters combine to form a third sound that would not individually be expected to develop from the combined letters, those combined letters are contrasted from other letters by use of a background screen.

16. An alphabet consisting of the letters of the American alphabet, in combination with a unified set of non-pictorial short-stroke phonograms, in which these phonograms may be suggestive of, or readily identifiable with the sound they are to represent, and in which these phonograms are placed above or below the plane of the word, in the location they are to be pronounced, so as not to alter the correct spelling of the word, and where these phonograms are to:
   a. have a consistent sound, in and of themselves, independent and independently of any letters;
   b. encompass in their breadth the span of vowel and diphthong soounds of the American language;
and where in this system, when two or more letters combine to form a third sound that would not individually be expected to develop from the combined letters, those combined letters are contrasted from oher letters by use of typeface contrast.

17. A set of phonograms, for use in reading, that may be used in conjunction with the orthography of the American alphabet, where the phonograms have a consistent, unaltering sound, in and of themselves, independent and independently of any letters; and where the phonograms have a shape that is suggestive of the sound they are to represent, in that their shape brings to mind in the student the mental visualization of an object or concept whose initial or significant sound is the same sound as the sound the phonogram is to represent; and where the phonograms include, but are not limited to:
   8 as "ay" in eight
   = as "ee" in equal
   — as "ah" in olive (looks like a bar)
   + as "eh" in add
   +, as "eh" in ED (variation of the add sign)
   ⌒ as "uh" in bud
   O as "o" in the letter "o"
   ⌐ as "aw" in awning (looks like an awning)
   00 as "oo" in boo! (suggestive of ghost eyes)
   ⊙ as "aye" in eye
   ⇔as "ow" in ouch! (looks like a combination of the "ah" and "o" phonograms)
   ơ as "oo" in book (suggestive of a bull)
   ſ as "ur" in curve (suggestive of a curve)
   ⌒ is "i" in igloo or in (suggestive of an igloo)

* * * * *